(12) United States Patent
Tan

(10) Patent No.: US 9,346,144 B2
(45) Date of Patent: May 24, 2016

(54) HAND-HELD POWER TOOL HAVING A SUPPORT DEVICE

(71) Applicant: Robert Bosch GmbH, Stuttgart (DE)

(72) Inventor: YenTiong Tan, Penang (MY)

(73) Assignee: Robert Bosch GmbH, Stuttgart (DE)

( * ) Notice: Subject to any disclaimer, the term of this patent is extended or adjusted under 35 U.S.C. 154(b) by 260 days.

(21) Appl. No.: 14/083,108

(22) Filed: Nov. 18, 2013

(65) Prior Publication Data

US 2014/0178142 A1 Jun. 26, 2014

(30) Foreign Application Priority Data

Dec. 20, 2012 (DE) .......................... 10 2012 223 908

(51) Int. Cl.
| | |
|---|---|
| *B27C 5/10* | (2006.01) |
| *B23Q 9/00* | (2006.01) |
| *B25F 5/02* | (2006.01) |
| *B27G 21/00* | (2006.01) |

(52) U.S. Cl.
CPC .............. *B23Q 9/0028* (2013.01); *B25F 5/021* (2013.01); *B27C 5/10* (2013.01); *B27G 21/00* (2013.01); *Y10T 409/306384* (2015.01); *Y10T 409/306608* (2015.01)

(58) Field of Classification Search
CPC ......................... B27C 5/10; Y10T 409/306608
USPC ......................................................... 409/182
IPC ......................................................... B27C 5/10
See application file for complete search history.

(56) References Cited

U.S. PATENT DOCUMENTS

| | | | | |
|---|---|---|---|---|
| 7,121,775 | B2 * | 10/2006 | Onose ........................ | B27C 5/10 144/136.95 |
| 7,552,749 | B2 * | 6/2009 | Kageler .................... | B27C 5/10 144/136.95 |
| 2006/0102248 | A1 | 5/2006 | Cooper et al. | |
| 2010/0126627 | A1 | 5/2010 | Goddard et al. | |
| 2010/0150679 | A1 | 6/2010 | Liu | |
| 2011/0229283 | A1* | 9/2011 | Kato ......................... | B27C 5/10 409/182 |
| 2012/0045290 | A1 | 2/2012 | Shibata et al. | |

FOREIGN PATENT DOCUMENTS

DE 10 2004 033 801 A1 2/2006

* cited by examiner

*Primary Examiner* — Daniel Howell
(74) *Attorney, Agent, or Firm* — Maginot, Moore & Beck LLP

(57) ABSTRACT

A hand-held power tool includes a machine housing and a support device configured to guide the hand-held power tool in a plane-parallel manner on a workpiece. The support device has a substantially hollow-cylindrical carrier element configured to at least portionally receive the machine housing. The carrier element has a longitudinal slot and a foot plate. The foot plate is disposed at a defined angle at an axial end facing toward the workpiece. The foot plate has a recess for an insert tool. The carrier element is clampable to the machine housing by a swivelable clamping lever and/or a rotatable clamping knob. The clamping lever and the clamping knob are connected to each other by a clamping screw.

12 Claims, 2 Drawing Sheets

HAND-HELD POWER TOOL HAVING A SUPPORT DEVICE

This application claims priority under 35 U.S.C. §119 to patent application no. DE 10 2012 223 908.1, filed on Dec. 20, 2012 in Germany, the disclosure of which is incorporated herein by reference in its entirety.

BACKGROUND

The present disclosure relates to a hand-held power tool, in particular a router, having a machine housing and a support device for guiding the hand-held power tool in a plane-parallel manner on a workpiece, the support device having a substantially hollow-cylindrical carrier element for at least portionally receiving the machine housing, and the carrier element having a longitudinal slot and having a foot plate, which is disposed at a defined angle at an axial end that faces toward the workpiece, and which has a recess for an insert tool, in particular a milling tool.

Known from the prior art are hand-held power tools, realized in the manner of a router, having support devices that have a hollow-cylindrical, longitudinally slotted basic body, which, by means of a clamping screw, can be clamped on a usually likewise cylindrical portion of a machine housing of the router. A foot plate, which is perpendicular to the basic body and has a recess for a milling tool rotating at high speed, is generally provided at an axial end of this basic body that faces toward a workpiece to be worked. Clamping of the support device, or basic body, to the machine housing of the router is effected by means of the clamping screw, which is generally provided with a rotary knob and can be screwed into a clamping nut that is received in a rotationally fixed manner. Rotation of the rotary knob causes the clamping screw and the clamping nut to be drawn together, thereby reducing a defined width of the longitudinal slot and reliably fixing the basic body to the machine housing.

In order to achieve a height adjustment of the router in relation to the workpiece to be worked, the basic body of the support device, after the clamping screw has first been released, can be displaced in the axial direction on the machine housing of the router and then fixed again, as described above. Adjustment in this case is effected steplessly.

In order to achieve a fine adjustment of a corresponding working height, a toothed wheel, which engages in a rack-type longitudinal toothing realized integrally on the machine housing of the router, can be fastened on the clamping screw. With the support device slightly released, therefore, fine adjustment of the working height can be achieved, in a range up to 1/10 mm, by slight rotation of the clamping screw by means of the rotary knob.

A disadvantage of the prior art is that, as a result of vibration, the clamping nut can become released from the clamping screw and consequently be lost. Moreover, in the case of a support device that has become at least partially released from the machine housing of the router, it is no longer possible to achieve optimum working results, and working safety is also greatly impaired.

SUMMARY

It is therefore an object of the disclosure to specify a new hand-held power tool, having a support device that can be reliably clamped to the machine housing and that has a long service life, with which, in particular, release of parts of the support device as a result of vibration, and associated separation of the support device, cannot occur, such that optimum working results with, at the same time, a high degree of working safety can be achieved in all application scenarios.

This problem is solved by a hand-held power tool, in particular a router, having a machine housing and a support device for guiding the hand-held power tool in a plane-parallel manner on a workpiece, the support device having a substantially hollow-cylindrical carrier element for at least portionally receiving the machine housing, and the carrier element having a longitudinal slot and having a foot plate, which is disposed at a defined angle at an axial end that faces toward the workpiece, and which has a recess for an insert tool, in particular a milling tool. The carrier element of the support device can be clamped to the machine housing by means of a swivelable clamping lever and/or a rotatable clamping knob, the clamping lever and the clamping knob being connected to each other by means of a clamping screw.

The disclosure thus makes it possible to provide a hand-held power tool, preferably realized as a router, having a support device that can be clamped to the machine housing, with which, in particular, separation of the support device from the machine housing as a result of vibration is at least substantially precluded.

Moreover, a user can easily and rapidly fix the support device to the machine housing in an ergonomic manner by rotating a clamping knob and/or shifting a clamping lever. Moreover, there is no need for a clamping nut, which could become released and fall off the clamping screw and become lost. Particularly advantageously, the support device is easily pre-tightened by rotation of the clamping knob. The clamping force can then be further increased by shifting of the clamping lever.

According to one embodiment, the longitudinal slot is parallel to a longitudinal axis of the support device, and a rotation axis of the clamping screw is disposed transversely in relation thereto.

As a result, the clamping force can be transferred in a particularly effective manner into the carrier element of the support device.

Preferably, two bearing blocks, each having an opening for rotatably receiving the clamping screw, are realized, opposite each other, on both sides of the longitudinal slot.

As a result, the carrier element of the support device provided with the longitudinal slot, in combination with the clamping knob, the clamping lever and the clamping screw, constitutes a clamping collar that can be fixed with a high clamping force to the machine housing of the hand-held power tool.

Preferably, the clamping knob is screwed on to a threaded portion of the clamping screw.

As a result, the clamping knob and the clamping lever are connected by means of the clamping screw, and can be tensioned against each other by rotation of the clamping knob, as a result of which the longitudinal slot draws together, or reduces in width, and the support device becomes clamped.

Preferably, the clamping lever has an eccentric, and a transverse pin, for connecting the swivelable clamping lever in an articulated manner in the region of the eccentric, is provided at an end of the clamping screw that faces away from the threaded portion.

As a result, the eccentric of the clamping lever can be rotated about a pivot axis that extends approximately transversely in relation to the rotation axis of the clamping screw. The eccentric in this case is supported on an outer face of the bearing block that faces toward it, such that, as the swiveling of the clamping lever is increased, the clamping knob and the clamping lever are tensioned against each other with a high mechanical force, the longitudinal slot is drawn together and the support device is fixed on the machine housing in a vibration-resistant manner.

Preferably, a washer is disposed on the clamping screw, between the eccentric of the clamping lever and a bearing block that faces toward the clamping lever, and the bearing block has, on the outside, a rotation locking means for the clamping lever.

As a result, as the clamping lever is being swiveled, the eccentric is supported on the washer, and not directly on the outer face of the bearing block, resulting in a reduced actuating force and a more uniform load distribution. The rotation locking means of the clamping lever may be constituted, for example, by two ribs of sufficient height that are spaced apart from each other and between which the eccentric of the clamping lever is located.

Preferably, a washer is disposed on the clamping screw, between a bearing block, which faces the clamping knob, and the clamping knob.

As a result, when the support device is being clamped by means of the clamping knob, smooth actuation of the latter and a more uniform load distribution are achieved.

In the case of one embodiment, a flute-type longitudinal receiver for an adjusting screw, for height adjustment of the support device, is provided in the region of a longitudinal edge of the longitudinal slot, the adjusting screw being parallel to the longitudinal slot and being rotatably received in a mounting realized in the region of the longitudinal receiver, beneath an actuating wheel of the adjusting screw.

Fine adjustment of the height, when the support device is in a largely released, non-clamped state, can be achieved by rotation of the adjusting screw. To facilitate actuation, the actuating wheel may be provided with a knurling and/or ribbing, for example, on its circumference.

According to a further advantageous configuration, a substantially rectangular projection, having a threaded gorge that faces toward the adjusting screw, for receiving a threaded portion of the adjusting screw, is realized on the machine housing and inside the longitudinal slot, at least portionally.

The threaded gorge, when acting in combination with the threaded portion of the adjusting screw, allows fine adjustment of the height of the support device, down to a few 1/10 mm. In addition, owing to the rack-type, rectangular projection, a radial spacing is achieved between the adjusting screw, received in the longitudinal guide, and the machine housing. The gorge of the projection has a cross-sectional geometry approximately in the shape of a quarter circle, the gorge having a thread into which the thread of the threaded portion of the adjusting screw can be introduced.

Preferably, when the support device is in a locked state, the threaded portion of the adjusting screw is in bearing contact substantially in the threaded gorge and, when the support device is in an unlocked state, the threaded portion of the adjusting screw is substantially lifted away from the threaded gorge, a change between the locked state and the unlocked state being in each case effected by a slight rotation of the support device about the longitudinal axis, relative to the machine housing.

As a result, in the locked state, a fine adjustment of the height can be achieved by means of the adjusting screw, while in the unlocked state—with the clamping lever and/or the clamping screw having additionally been released—the support device can be displaced directly on the machine housing of the hand-held power tool, independently of the adjusting screw, for rapid rough adjustment of the height.

Preferably, the support device is made of a plastic material and/or a metallic material.

This results, on the one hand, in the support device being of low weight, the plastic material at the same time making it possible to achieve inexpensive large-scale production, with an excellent dimensional consistency and reliable reproducibility of the production results. Moreover, particularly in the case of predominant use of a plastic material, the support device can be made almost entirely transparent, thereby making it considerably simpler for a user to guide the hand-held power tool, or insert tool, in the region of the workpiece. Furthermore, the plastic material has a high corrosion resistance and impact resistance, and additionally ensures that the hand-held power tool provided with a support device has a long service life.

BRIEF DESCRIPTION OF THE DRAWINGS

The disclosure is described more fully in the following description on the basis of exemplary embodiments represented in the drawings, wherein.

DETAILED DESCRIPTION

Figure 1:
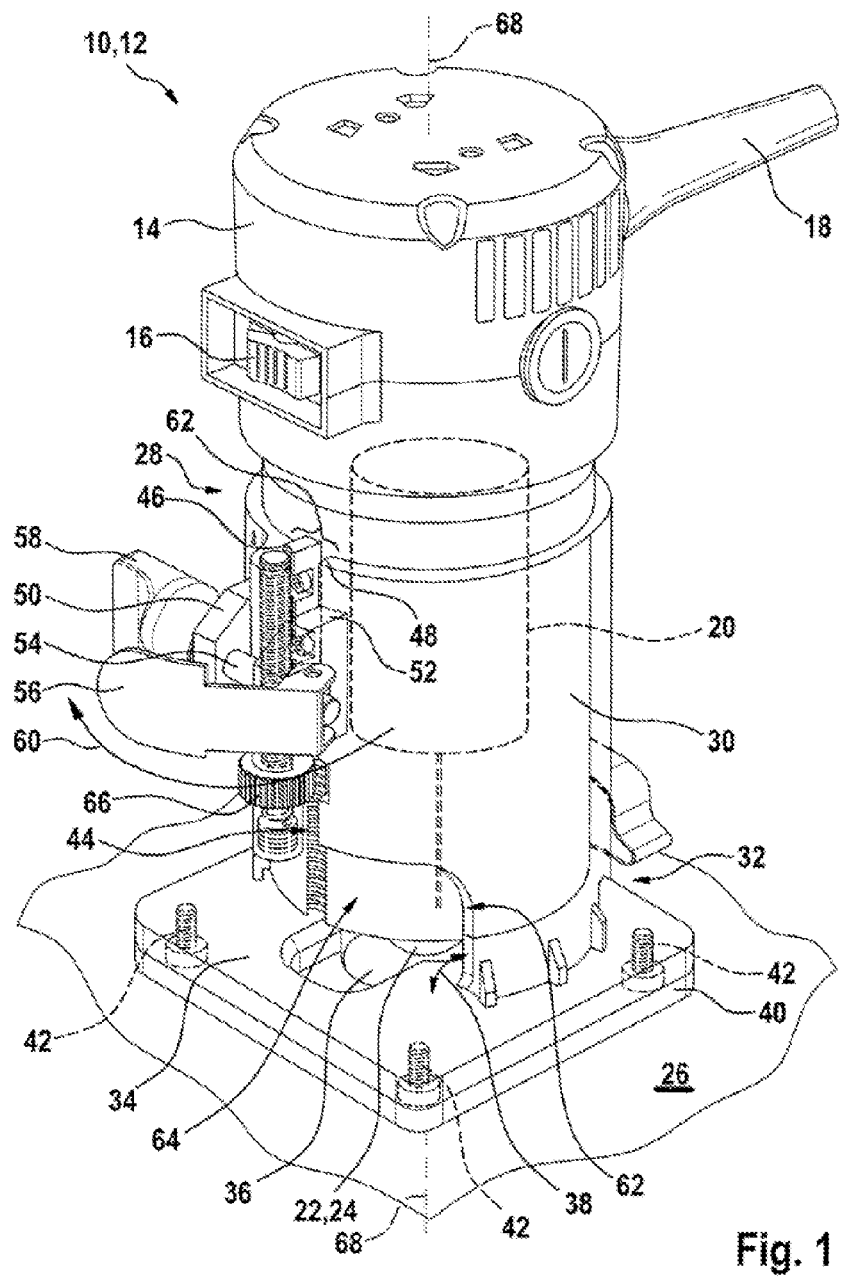
FIG. 1 shows a perspective view of a hand-held power tool, realized as a router having a support device, according to one embodiment.

FIG. 1 shows a hand-held power tool 10 realized, exemplarily, as a router 12 that, illustratively, has a machine housing 14, a power switch 16 and a mains power supply cable 18. It must be pointed out, however, that the present disclosure is not limited to a router 12 whose operation is dependent on a mains power supply but, rather, can also be used in the case of routers, or hand-held power tools, that can be operated independently of a mains power supply and that can be connected, e.g. mechanically and electrically, to an associated battery pack, or that have an alternative pneumatic drive.

An insert tool 24 of the router 12, which in this case is realized, purely exemplarily, as a milling tool 22, can be driven at high rotational speed by means of a drive motor 20. For the purpose of guiding the router 12 in a precise plane-parallel manner on a workpiece 26, the router 12 has a support device 28, which has an at least substantially hollow-cylindrical carrier element 30 for at least portionally receiving the machine housing 14. The support device 28 is made of a preferably transparent plastic material of adequate mechanical load-bearing capacity and/or of a metallic material such as, for example, an aluminum, zinc, brass alloy or the like.

A foot plate 34, having a recess 36 for lead-through of the insert tool 24, is realized at a defined angle 38, in this case of 90°, by way of example, at an axial end 32 of the carrier element 30 that faces toward the workpiece 26. To enable the router 12 to be guided on the workpiece 26 with the least possible amount of friction, the foot plate 34 has a support 40 on its underside. This exemplarily plate-type, flat support 40 is preferably made of a material having a low coefficient of sliding frictions, such as, for example, PTFE, PE, PP or the like and, illustratively, is connected to the foot plate 34 by means of screws 42. Alternatively, the support 40 can also, for example, be adhesive-bonded to the foot plate 34.

The hollow-cylindrical carrier element 30 has a continuous longitudinal slot 44 having two longitudinal edges 46, 48 that are parallel to and spaced apart from each other. Owing to the longitudinal slot 44, the support device 28 is sufficiently elastic in the circumferential direction, such that it can be clamped on the machine housing 14. Provided in the region of each longitudinal edge 46, 48 there is a respective bearing block 50, 52, the bearing blocks 50, 52 on both sides in each case being realized opposite each other and spaced apart parallelwise from each other on the longitudinal edges 46, 48 of the longitudinal slot 44. A clamping screw 54, extending transversely in relation to the longitudinal slot 44, is rotatably received in the bearing blocks 50, 52.

A clamping lever 56 and a clamping knob 58 are connected to each other via the clamping screw 54. As a result of swiveling of the clamping lever 56 in the direction of an arrow 60 and/or rotation of the clamping knob 58, e.g. in the clockwise direction, the clamping knob 58 and the clamping lever 56 are mechanically tensioned against each other, such that the bearing blocks 50, 52 are drawn together and a width 62 of the longitudinal slot 44 is reduced. As a result of the consequential reduction of the circumference of the hollow-cylindrical carrier element 30 of the support device 28, the latter is clamped with a high force to the machine housing 14, or reliably fixed on the latter. Conversely, the support device 28 can be released if the clamping lever 56 is shifted contrary to the direction of the arrow 60 and/or if the clamping knob 58 is rotated, for example, in the counter-clockwise direction.

In order to create a sufficient clearance beneath the machine housing 14 in the region of the insert tool 24, at least one large-area, door-type recess 64, into which the longitudinal slot 44 opens in the region of the axial end 32, is made in the hollow-cylindrical carrier element 30, in the region of the axial end 32. This at least one recess 64 is preferably located on the same side of the machine housing 14 as the power switch 16 of the router 12. By means of a, for example, knurled or ribbed actuating wheel 66—with the support device 28 sufficiently released—the latter can be displaced on the machine housing 14, along a longitudinal axis 68 of the support device 28, or of the router 12, or the machine housing 14 can be displaced relative to the carrier element 30. This makes it possible to effect a fine adjustment of a distance between the workpiece 26 and the insert tool 24 of the router 12.

Figure 2:
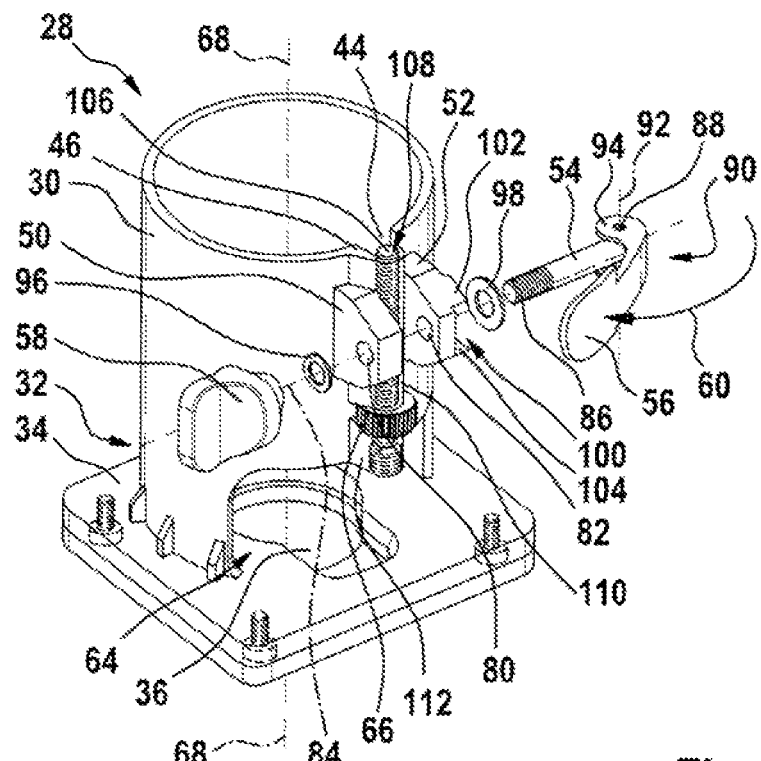
FIG. 2 shows a perspective exploded view of the support device from FIG. 1.

FIG. 2 shows the support device 28 from FIG. 1 for the purpose of illustrating the clamping knob 58 and the clamping lever 56, which are connected to each other by means of the clamping screw 54, which is received in two openings 80, 82 in the bearing blocks 50, 52 so as to be rotatable about a rotation axis 84. The clamping knob 58 can be screwed on to a threaded portion 86 of the clamping screw 54 and, by means of a transverse pin 88 at an end 90 of the clamping screw 54 that faces away from the threaded portion 86, the clamping lever 56 is fastened to the clamping screw 54 so as to be swivelable about a vertical axis 92. To enable the clamping knob 58 to be screwed on to the threaded portion 86, the clamping knob 58 preferably has an internal thread, which is configured to correspond to the thread of the threaded portion 86 of the clamping screw 54.

To enable the clamping lever 56 to be tensioned with the clamping knob 58, the clamping lever 56, in the region of the transverse pin 88, preferably has an eccentric 94, which is supported on the bearing block 52. Between the clamping knob 58 and the bearing block 50 there is also a washer 96, and a washer 98 is likewise provided in the region of the bearing block 52 and the eccentric 94 of the clamping lever 56, in order to facilitate actuation of the clamping knob 58, or of the clamping lever 56, for a user and, at the same time, to achieve a maximally large-area introduction of force into the bearing blocks 50, 52 when the support device 28 is being clamped on the machine housing 14 of the router 12 from FIG. 1.

In addition, realized on the bearing block 52 that faces toward the clamping lever 56 there is a rotation locking means 100 having two longitudinal ribs 102, 104, between which the eccentric 94 of the clamping lever 56 can be received with a small amount of play, such that, when the support device 28 is in the clamped state, the clamping lever cannot rotate about the rotation axis 84 of the clamping screw 54 when, for example, the clamping knob 58 is rotated.

An adjusting screw 106, which extends in the region of and parallel to the longitudinal slot 44, and which has a threaded portion 108 and is rotatably received in a flute-type longitudinal receiver 110 disposed on the longitudinal edge 46, is used for fine adjustment of a working height of the support device 28 in relation to the workpiece to be worked (26 in FIG. 1), when the support device 28 has been sufficiently released. A cross-sectional geometry of the flute-type longitudinal receiver 110 is approximately in the shape of a quarter circle. The rotation of the adjusting screw 106 in this case is effected by means of the actuating wheel 66, as described in the case of FIG. 1. Furthermore, the adjusting screw 106 is mounted in the region of a mounting 112 of the support device 28 that is realized beneath the actuating wheel 66.

For the purpose of tightening the support device 28 on the machine housing 14 of the router 12 from FIG. 1, the clamping lever 56 is swiveled in the direction of the black arrow 60, as a result of which the eccentric 94 is pressed with a high mechanical force against the associated bearing block 52, and the support device 28 is fixed on the machine housing 14 in a vibration-resistant manner. This presupposes, however, that, for example as a result of rotation of the clamping knob 58 in the clockwise direction, a slight mechanical bias has already been built up between the clamping knob 58 and the clamping lever 56, such that the clamping knob 58 and the eccentric 94 bear against the bearing blocks 50, 52 at least largely in a gap-free manner. This procedure is advantageous, since the clamping path that can be generated by the eccentric 94 as the clamping lever 56 is shifted is relatively small. To release the support device 28, the procedure is reversed.

Figure 3:
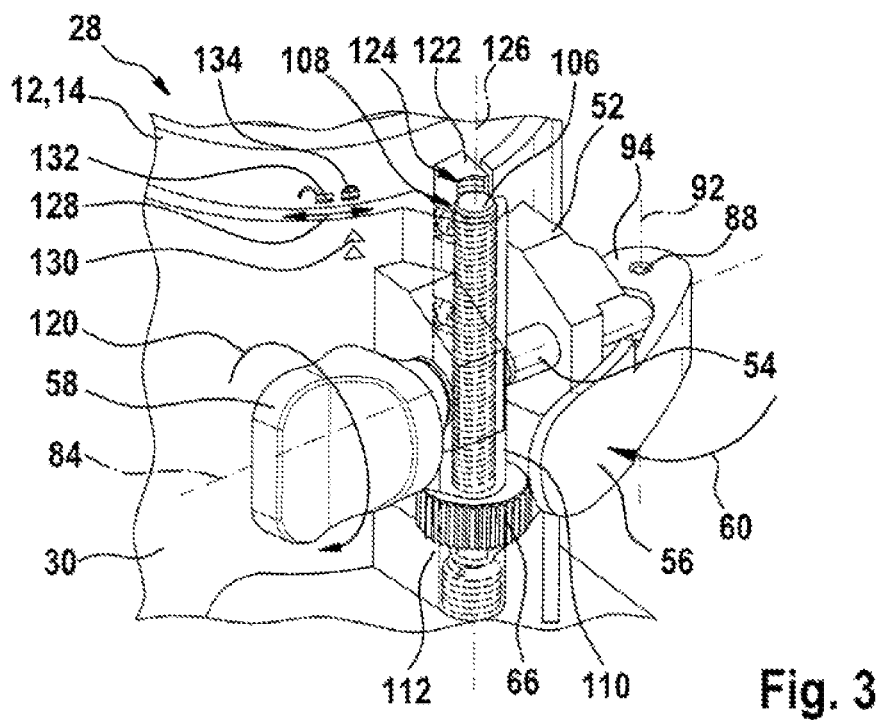
FIG. 3 shows an enlarged perspective view of the hand-held power tool with the (partly) released support device.

FIG. 3 shows an enlargement of the hollow-cylindrical carrier element 30 of the support device 28 from FIGS. 1 and 2, pushed on to the machine housing 14 of the router 12 from FIG. 1. In this case, the support device 28 has been set to a defined working height of the router 12. It is then only possible to alter this working height if the support device 28 is not clamped with maximum clamping force on the machine housing 14, i.e. if it is in a partially released state.

To enable the working height to be set, there is provided on the machine housing 14 a substantially rectangular, rack-type projection 122, which is preferably screw-connected to the machine housing 14 or fastened to the latter in another appropriate manner. This, on the one hand, facilitates mounting of the router 12 and, on the other hand, facilitates exchange of the rack-type projection 122, for example in the case of wear.

The projection 122 has a threaded gorge 124, which faces toward the adjusting screw 106 and which has a cross-sectional geometry approximately in the shape of a quarter circle, for receiving the threaded portion 108 of the adjusting screw 106, which can be rotated about its rotation axis 126 by means of the actuating wheel 66. The threaded portion 108 of the adjusting screw 106 acts in combination with the threaded gorge 124 of the projection 122 in the manner of a worm gear.

The carrier element 30 of the support device 28, which, when in the partially released state, enables a relative rotation to be effected between the machine housing 14 and the carrier element 30, in the direction of a double arrow 128, it being possible to effect at least a slight rotation of the support device 28 about the longitudinal axis (68 from FIG. 1) in relation to the machine housing 14, has a marking 130, which has two equilateral triangles, disposed over one another, that can be brought to coincide with a marking 132 for an "unlocked state" or with a marking 134 for a "locked state" by corresponding rotation. The marking 132 for the "unlocked state" is constituted by an opened padlock, while the marking 134 for the "locked state" is indicated to a user by a closed padlock. In the state illustrated in FIG. 3, therefore, the support device 28 is in the "locked state", since the markings 130, 134 are positioned over one another.

In this "locked state" the threaded portion 108 of the adjusting screw 106 engages in the threaded gorge 124 of the projection 122, such that, when the clamping has been sufficiently released, it is possible to effect fine adjustment of the support device 28 in relation to the machine housing 14, and therefore to set the working height of the router 12 in relation to the workpiece to be worked (26 in FIG. 1) by rotating the actuating wheel 66. Depending on the actual thread used, it is thereby possible to achieve a fine adjustment of the working height of the router 12 in the range of less than 1/10 mm.

In addition, however, in order that a rapid rough adjustment of the working height can also be effected, the relative rotation between the machine housing 14 and the carrier element 30 must be effected in such a manner that the marking 130 comes to coincide with the marking 132 for the "unlocked state". When in this position, the threaded portion 108 has been fully disengaged from the threaded gorge 124, such that the machine housing 14 can be displaced in the carrier element 30, independently of the actuating wheel 66, in the axial direction of the carrier element 30.

After the desired fine or rough adjustment of the working height of the router 12 has been achieved, the support device 28—as already explained above—can be fixed on the machine housing 14 of the router 12 by rotation of the clamping knob 58 and/or shifting of the clamping lever 56.

What is claimed is:

1. A hand-held power tool, comprising:
   a machine housing;
   a support device configured to guide the hand-held power tool in a plane-parallel manner on a workpiece, the support device including:
      a substantially hollow-cylindrical carrier element configured to at least portionally receive the machine housing, the carrier element including:
         a longitudinal slot; and
         a foot plate disposed at a defined angle at an axial end facing toward the workpiece, the foot plate having a recess for an insert tool; and
      a flute-type longitudinal receiver configured to at least partially receive an adjusting screw to enable height adjustment of the support device and arranged in a region of a longitudinal edge of the longitudinal slot,
   wherein the adjusting screw is parallel to the longitudinal slot and is rotatably received in a mounting provided in a region of the longitudinal receiver, beneath an actuating wheel of the adjusting screw,
   wherein the carrier element of the support device is clampable to the machine housing via at least one of a swivelable clamping lever and a rotatable clamping knob, and
   wherein the clamping lever and the clamping knob are connected to each other by a clamping screw.

2. The hand-held power tool according to claim 1, wherein: the longitudinal slot is parallel to a longitudinal axis of the support device, and
   a rotation axis of the clamping screw is disposed transversely in relation to the longitudinal axis.

3. The hand-held power tool according to claim 1, further comprising:
   two bearing blocks, each bearing block having an opening configured to rotatably receive the clamping screw,
   wherein the bearing blocks are arranged, opposite each other, on sides of the longitudinal slot.

4. The hand-held power tool according to claim 3, wherein the clamping knob is screwed on to a threaded portion of the clamping screw.

5. The hand-held power tool according to claim 4, wherein the clamping lever includes:
   an eccentric; and
   a transverse pin, the transverse pin configured to connect the swivelable clamping lever in an articulated manner in a region of the eccentric, the transverse pin provided at an end of the clamping screw facing away from the threaded portion.

6. The hand-held power tool according to claim 5, wherein:
   a washer is disposed on the clamping screw, between the eccentric of the clamping lever and a bearing block that faces toward the clamping lever, and
   the bearing block that faces toward the clamping lever has, on an outside, a rotation locking mechanism for the clamping lever.

7. The hand-held power tool according to claim 1, wherein:
   a washer is disposed on the clamping screw between a bearing block that faces toward the clamping knob and the clamping knob.

8. The hand-held power tool according to claim 1, further comprising:
   a substantially rectangular projection arranged on the machine housing and at least portionally inside the longitudinal slot, the substantially rectangular projection having a threaded gorge that faces toward the adjusting screw,
   wherein the threaded gorge is configured to receive a threaded portion of the adjusting screw.

9. The hand-held power tool according to claim 8, wherein:
   when the support device is in a locked state, the threaded portion of the adjusting screw is in bearing contact substantially in the threaded gorge,
   when the support device is in an unlocked state, the threaded portion of the adjusting screw is substantially lifted away from the threaded gorge, and
   a change between the locked state and the unlocked state is brought about by slight rotation of the support device about the longitudinal axis, relative to the machine housing.

10. The hand-held power tool according to claim 1, wherein the support device is made of at least one of a plastic material and a metallic material.

11. The hand-held power tool according to claim 1, wherein the hand-held power tool is a router.

12. The hand-held power tool according to claim 1, wherein the insert tool is a milling tool.

* * * * *